Aug. 27, 1963 T. J. ROSEBERRY 3,101,531
METHOD OF APPLYING INTERNAL METALLIC LININGS
TO TUBES AND THE LIKE
Filed Jan. 9, 1961
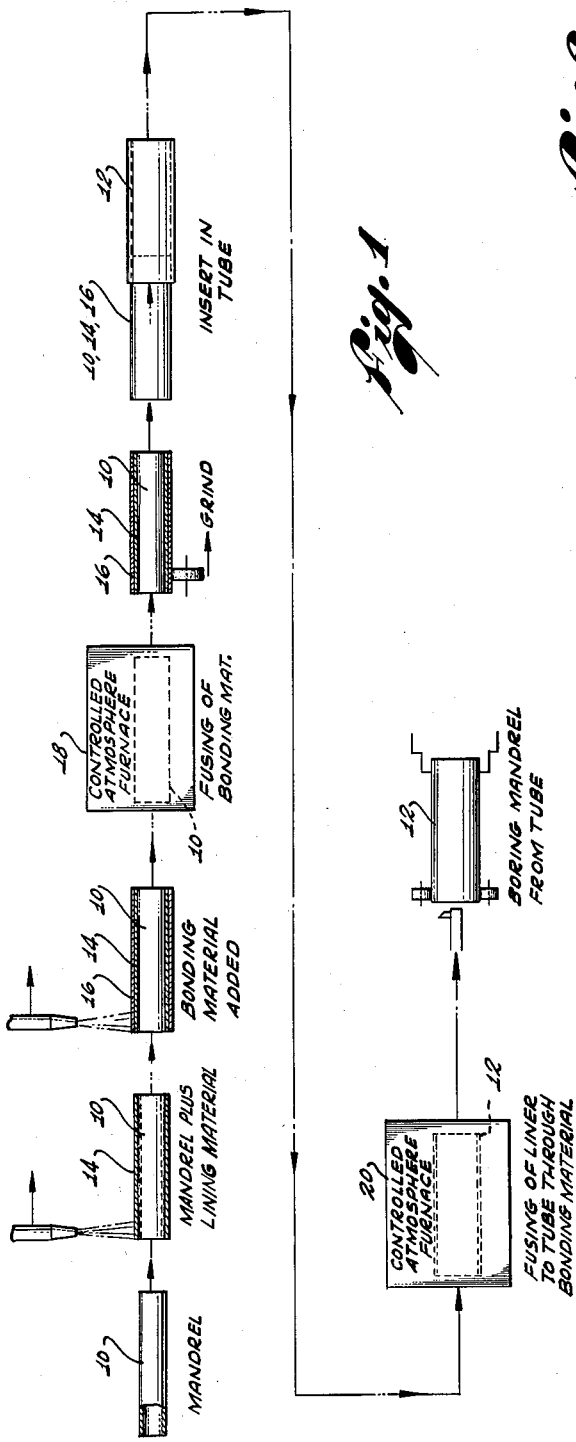
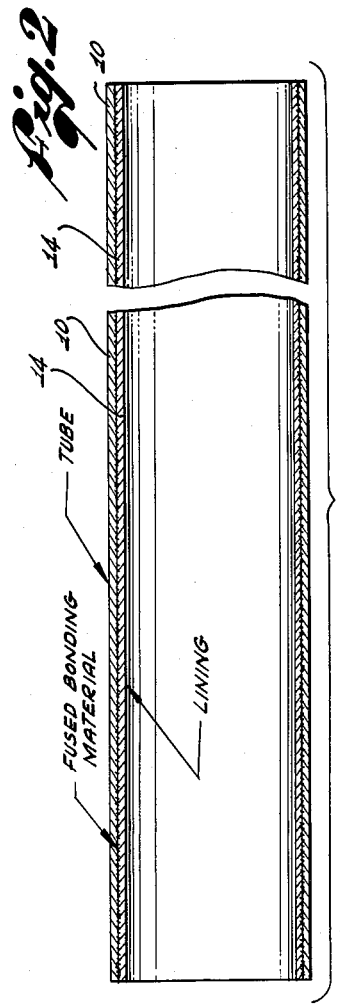
INVENTOR.
THOMAS J. ROSEBERRY
BY
Attorneys

United States Patent Office 3,101,531
Patented Aug. 27, 1963

3,101,531
METHOD OF APPLYING INTERNAL METALLIC LININGS TO TUBES AND THE LIKE
Thomas J. Roseberry, Anaheim, Calif., assignor to Western Gear Corporation, Lynwood, Calif., a corporation of California
Filed Jan. 9, 1961, Ser. No. 81,485
3 Claims. (Cl. 29—474.4)

This invention relates generally to internally lined tubes and has as its general object to provide a new and unique process for lining tubes internally.

Another object of the inevntion is to provide a process of the character described wherein the liner material is fusion bonded to the lined tube.

Yet another object of the invention is to provide a process of the character described which is especially adapted to lining tubes with metals having relatively high melting points.

A further object of the inevntion is to provide a process of the character described which is extremely simple and economical and provides a superior end product.

Other objects, advantages and features of the invention will become readily evident as the description proceeds.

The invention will now be described in detail by reference to the attached drawing wherein:

FIG. 1 diagrammatically illustrates the present process; and

FIG. 2 is an enlarged, longitudinal section through a tube which has been internally lined by the present process.

Referring first to FIG. 1 of the drawing, the first step of the present process involves the preparation of a mandrel 10. This mandrel is machined or otherwise provided with an outside diameter which is slightly less than the desired final inside diameter of the tube 12 to be lined.

The next step of the process involves coating the mandrel with the material 14 with which the tube 12 is to be lined. As was preliminarily noted, and as will become apparent as the description proceeds, the present process is especially adapted for lining tubes with metals having relatively high melting points. The liner material 14 may be applied to the mandrel in various well-known ways, such as by a high temperature spray technique as diagrammatically illustrated in the drawing.

The third step of the process involves applying a layer of fushion bonding material 16 to the coated mandrel resulting from step two. Various types of fushion bond materials are known which may be used in the present process, such as copper, silver alloys, and chrome-nickel-boron alloy. The bonding material may be applied in any convenient way, such as by a spray technique, plating or manually.

The bonding material is now fused to the liner material 14 on the mandrel. This may be accomplished in a controlled atmosphere furnace 18, for example, or otherwise by an oxyacetylene torch or any other suitable means.

The coated and fused mandrel emerging from the furnace is ground or otherwise machined to an outside diameter which will afford on the order of a .001 inch interference press fit of the coated mandrel in the tube 12 to be lined. After machining, the mandrel is pressed into tube 12, as illustrated. This obviously places the machined outer surface of the layer of bonding material 16 in intimate contact with the inner surface of the tube 12 to be lined.

Bonding material 16 is now fused to the tube 12 by placing the assembled tube and mandrel in a furnace 20 like the furnace 18 or in any other suitable way. During this step, then, the liner material 14 acquires a fusion bond to the tube 12.

Final step eight of the process involves removal of the mandrel 10 from the assembly. This may be accomplished in various ways, such as by a boring operation as illustrated. The tube 10 with its fusion bonded liner 14 remains, as illustrated in FIG. 2, and forms the final product of the process.

It is obvious, therefore, that the process herein described and illustrated is fully capable of attaining the several objects and advantages set forth.

What is claimed is:

1. The method of lining a tube, which comprises the steps of:
    preparing a cylindrical mandrel having an external diameter less than the internal diameter of the tube,
    coating said mandrel with a layer of a metallic lining material having an external diameter slightly less than the internal diameter of the tube,
    coating said layer of lining material with a layer of fusion bonding material having an external diameter slightly greater than the internal diameter of the tube,
    heating the coated mandrel to a temperature sufficient to fuse said layer of fusion bonding material to said layer of metallic lining material,
    machining the coated mandrel to afford the latter with a friction fit in said tube,
    press fitting the machined, coated mandrel into the tube,
    heating the tube and coated mandrel therein to fuse said layer of fusion bonding material to the inner wall of the tube, and
    removing said mandrel from the tube by passing a rotary, metal cutting tool having a diameter less than the external diameter of said layer of lining material axially through the tube.

2. The method of lining a tube, which comprises the steps of:
    preparing a cylindrical mandrel having an external diameter less than the internal diameter of the tube,
    coating said mandrel with a layer of a metallic lining material having an external diameter slightly less than the internal diameter of the tube,
    coating said layer of lining material with a layer of metallic fusion bonding material having an external diameter slightly greater than the internal diameter of the tube,
    heating the coated mandrel to a temperature sufficient to fuse said layer of metallic fusion bonding material to said layer of metallic lining material,
    machining the coated mandrel to afford the latter with a friction fit in said tube,
    press fitting the machined, coated mandrel into the tube,
    heating the tube and coated mandrel therein to fuse said layer of metallic fusion bonding material to the inner wall of the tube, and
    removing said mandrel from the tube by passing a rotary, metal cutting tool having a diameter less than the external diameter of said layer of lining material axially through the tube.

3. The method of lining a tube, which comprises the steps of:
    preparing a cylindrical mandrel having an external diameter less than the internal diameter of the tube,
    spraying a molten metallic lining material on said mandrel to provide the latter with a layer of said lining material having an outside diameter slightly less than the internal diameter of the tube,
    spraying a molten metallic fusion bonding material over said layer of metallic lining material to provide the mandrel with a layer of metallic fusion bonding material having an outside diameter greater than the internal diameter of the tube, heating the coated mandrel to a temperature sufficient to fuse said layer of metallic fusion bonding material to said layer of metallic lining material, machining the coated mandrel to afford the latter with a friction fit in said tube, press fitting the machined, coated mandrel into the tube, heating the tube and coated mandrel therein to fuse said layer of metallic fusion bonding material to the inner wall of the tube, and removing said mandrel from the tube by passing a rotary, metal cutting tool having a diameter less than the external diameter of said layer of lining material axially through the tube.

References Cited in the file of this patent
UNITED STATES PATENTS

| | | |
|---|---|---|
| 642,539 | Thoma | Jan. 30, 1900 |
| 1,745,483 | Hansen | Feb. 4, 1930 |
| 2,074,007 | Wissler | Mar. 16, 1937 |
| 2,768,921 | Pigg | Oct. 30, 1956 |